W. O. BERRY.
COUPLING DEVICE.
APPLICATION FILED APR. 12, 1920.
1,353,713. Patented Sept. 21, 1920.
2 SHEETS—SHEET 1.
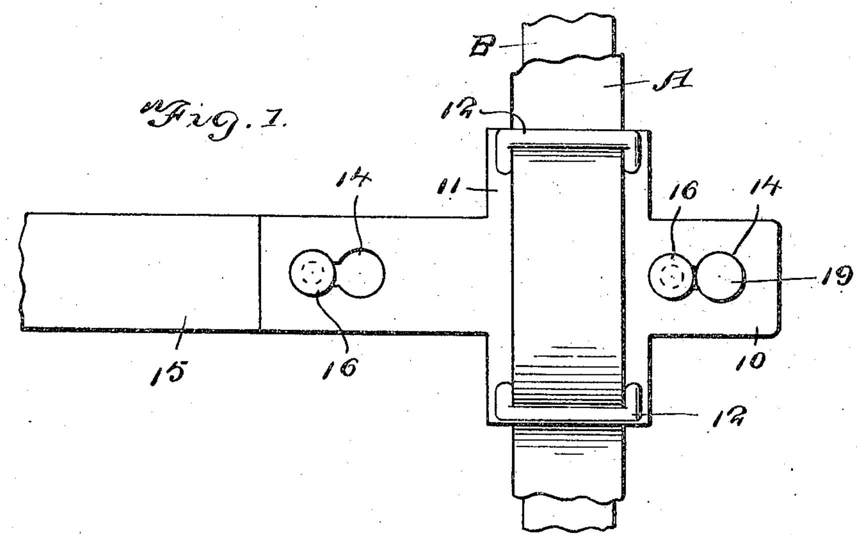
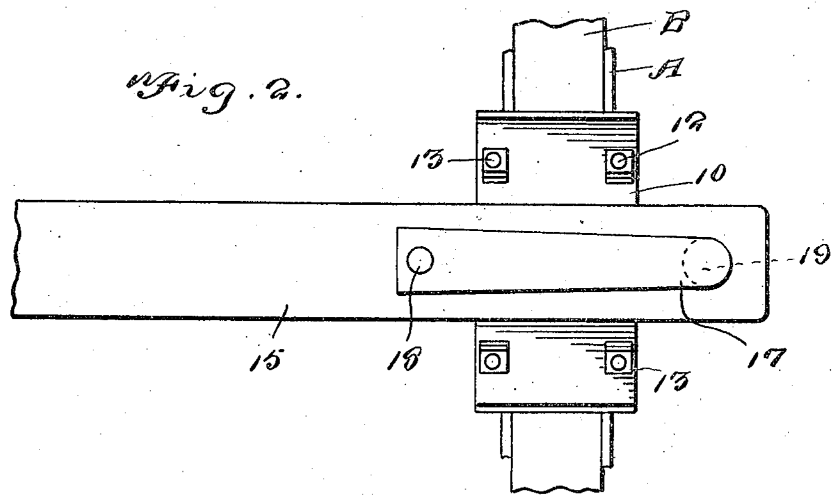
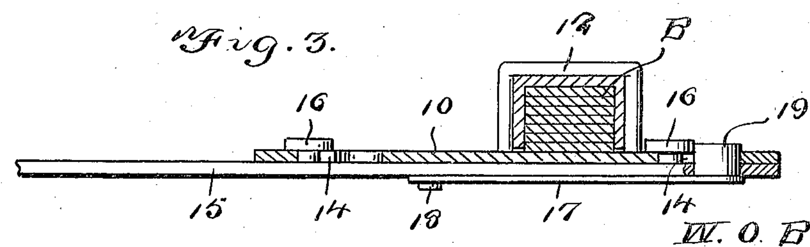
W. O. Berry
INVENTOR
BY Victor J. Evans
ATTORNEY
WITNESS: [signatures]

W. O. BERRY.
COUPLING DEVICE.
APPLICATION FILED APR. 12, 1920.
1,353,713. Patented Sept. 21, 1920.
2 SHEETS—SHEET 2.
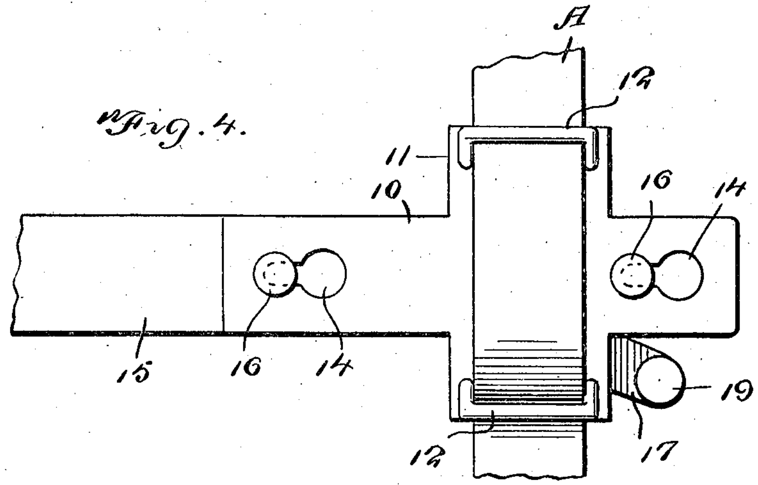
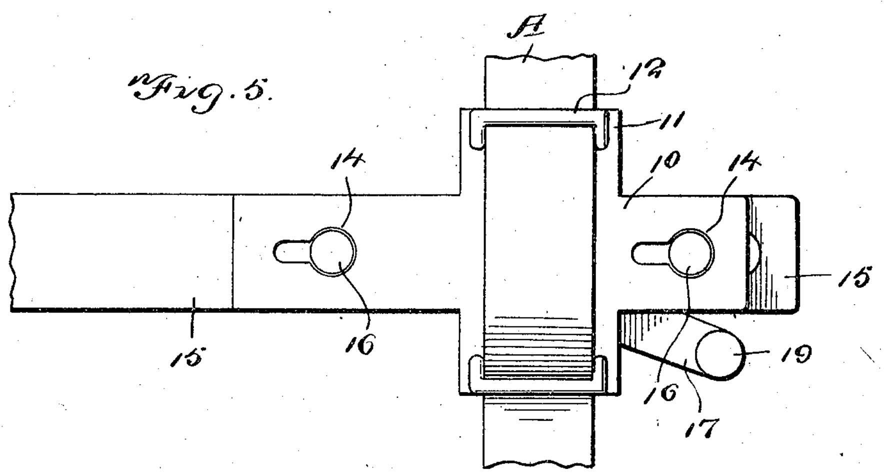
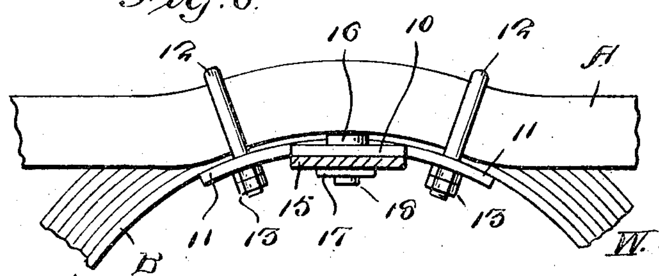
W. O. Berry
INVENTOR
E. R. Ruppert.
J. M. Jester
WITNESS:
BY Victor J. Evans
ATTORNEY

UNITED STATES PATENT OFFICE.

WILLIAM O. BERRY, OF CARO, MICHIGAN, ASSIGNOR OF ONE-HALF TO WILLIAM F. WALLIS, OF CARO, MICHIGAN.

COUPLING DEVICE.

1,353,713. Specification of Letters Patent. Patented Sept. 21, 1920.

Application filed April 12, 1920. Serial No. 373,255.

*To all whom it may concern:*

Be it known that I, WILLIAM O. BERRY, a citizen of the United States, residing at Caro, in the county of Tuscola and State of Michigan, have invented new and useful Improvements in Coupling Devices, of which the following is a specification.

This invention relates to attachments for motor vehicles and has for its object the provision of a novel form of draft device adapted to be secured upon the rear spring of an automobile and including a draw-bar to be connected with a trailer or other vehicle to be pulled, the draw-bar being quickly and easily detachable from the body of the device which is secured permanently upon the rear spring of the automobile.

An important object is the provision of a device of this character which is so constructed that the draw-bar cannot become accidentally disengaged from the body of the device and yet which is so constructed that it may be very quickly and easily disengaged when desired.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a plan view showing the rear portion of the chassis of a motor vehicle and showing my device thereon in plan, Fig. 2 is a bottom plan view, Fig. 3 is a longitudinal sectional view, Fig. 4 is a plan view showing the locking member swung to inoperative position, Fig. 5 is a similar view showing the draw-bar moved to bring the headed studs thereon into registration with the holes in the stationary portion of the device, Fig. 6 is a cross sectional view through the device, looking at the spring of the vehicle.

Referring more particularly to the drawings, the letter A designates a portion of the rear end of the chassis of a motor vehicle and B designates the rear spring thereof, this spring being shown as of the transverse type.

In carrying out my invention I provide a stationary body portion 10 formed as a plate disposed against the underside of the spring B centrally thereof and this plate is formed with lateral extensions 11 through which pass U-bolts 12 which encircle the spring and which are provided with clamping nuts 13 whereby the plate may be rigidly secured upon the spring. The plate 10 is elongated and has its forward and rear ends formed with key-hole slots 14.

The numeral 15 designates the draw-bar which carries spaced headed studs 16 engaging within the key-hole slots 14 and it will be observed that this draw-bar is placed against the underside of the plate 10. When the draw-bar is placed against the plate with the studs 16 passing through the larger portions of the key-hole slots and the draw-bar is subsequently pulled rearwardly, the studs will enter the smaller portions of the key-hole slots so that the heads of the studs will engage over the material at the sides of the slots and hold the parts together.

In order to lock the draw-bar 15 against longitudinal movement with respect to the plate 10, I provide a resilient or spring member 17 which is pivoted at 18 upon the underside of the draw-bar and which extends beyond the end thereof. This spring 17 carries a lug 19 which extends upwardly and which is adapted to extend within and fill the larger portion of the key-hole slot at the forward end of the plate 10. When this locking member is in position it will be seen that any longitudinal movement of the draw-bar with respect to the plate 10 will result in engagement of the stud 16 at the forward end of the device with the lug 19. It will thus be observed that the parts will not become displaced.

Under ordinary conditions, that is when the use of the device is not desired, the spring member 17 is pulled downwardly to disengage the lug 19 from the key-hole slot and is then swung laterally into the position shown in Fig. 3, after which the draw-bar 15 is pushed forwardly to bring the headed studs into the larger portions of the key-hole slots whereupon the draw-bar may be disengaged from the plate 10. The plate 10 of course remains permanently upon the spring B and will not be particularly noticeable while the draw-bar may be carried within the automobile. It will be observed that there are not any movable parts on the body plate 10 so that there will be no rattling. The rear end of the draw-bar 15 may be attached to a trailer or other vehicle to be pulled, by any suitable means, and this detail forms no part of the present invention.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A draft device comprising a plate disposed against the underside of the rear spring of a vehicle and rigidly clamped thereto, said plate being provided with key-hole slots, a draw-bar disposed against the underside of the plate and carrying headed studs engaging within said key-hole slots, and a spring pivoted at one end upon the underside of the draw-bar and having a lug engageable within the key-hole slots in advance of the studs therein.

2. A device of the character described comprising a plate disposed against the underside of the rear spring of a vehicle and having lateral extensions, U-bolts embracing the spring, passing through said extensions and carrying clamping nuts whereby to secure the plate in position, said plate being elongated whereby its ends will be disposed forwardly and rearwardly of the spring, said ends being provided with key-hole slots, a draw-bar disposed against the underside of said plate and carrying headed studs engageable within said key-hole slots, and a locking member engageable within one of said slots subsequently to the insertion of the stud therein.

In testimony whereof I affix my signature.

WILLIAM O. BERRY.